UNITED STATES PATENT OFFICE.

JULIAN KICH, OF LYNDORA, PENNSYLVANIA.

MATERIAL FOR TREATING COPPER.

1,041,297.  Specification of Letters Patent.  Patented Oct. 15, 1912.

No Drawing.  Application filed March 21, 1912. Serial No. 685,388.

*To all whom it may concern:*

Be it known that I, JULIAN KICH, residing at Lyndora, in the county of Butler and State of Pennsylvania, a subject of the Emperor of Austria-Hungary, have invented or discovered certain new and useful Improvements in Material for Treating Copper, of which improvements the following is a specification.

The invention described herein relates to certain improvements in the treatment of copper whereby it is increased in hardness and in other respects.

In the practice of my invention, I employ several compounds which are formed as follows:

No. 1 consists of the following ingredients in approximately the proportions stated:—½ oz. welding compound, ½ oz. copperas or ferrous sulfate, ½ oz. powdered bones, ½ oz. ferro-silicon, ½ oz. potash, ½ oz. limestone. The principal ingredients of this welding compound are: 50% boric anhydrid, iron oxid 15%, soda 15%, and potash in 20% in about the proportions stated. The ingredients of this compound are finely powdered and thoroughly mixed together, and about 18¾% of this mixture is added to about 81.4% copper, when the latter has been sufficiently melted to permit of the stirring in of the compound. This mixture added to the copper renders the same very hard and dense.

A somewhat softer material may be produced by adding to 87½% of copper 12½% of a mixture consisting of ½ oz. limestone, ½ oz. potash, 1 oz. ferro-silicon.

A third mixture which will produce good results, if added in the proportion of 25% of the mixture to 75% of the copper, consists of ½ oz. welding compound, ½ oz. copperas or ferrous sulfate, ½ oz. sulfate of copper, ½ oz. ferro-silicon, ½ oz. potash, ½ oz. limestone, ½ oz. manganese, ½ oz. phosphorus.

A fourth mixture, added in about the proportion of 15¼% to 84¾% copper, while not producing as hard and dense a material as the mixture heretofore stated, will produce one useful for many purposes. This mixture consists of ferro-silicon, potash, phosphorus, welding compound, limestone, ½ oz. of each of the above materials.

It will be observed that each of the foregoing mentioned mixtures contains as a base, or common ingredients, potash, ferro-silicon, and limestone, and that the effects produced by the mixture of these three ingredients is modified, *i. e.*, increased or diminished by the addition of the other elements stated.

I claim herein as my invention:

1. A material for treating copper consisting of potash, ferro-silicon, and limestone.

2. A material for treating copper consisting of potash, ferro-silicon, limestone, and a welding compound.

In testimony whereof, I have hereunto set my hand.

JULIAN KICH.

Witnesses:
G. G. TRICE,
M. MILICEVICH.